W. FRENCH & J. W. PRENTICE.
Hand-Cultivators.
No. 156,919. Patented Nov. 17, 1874.
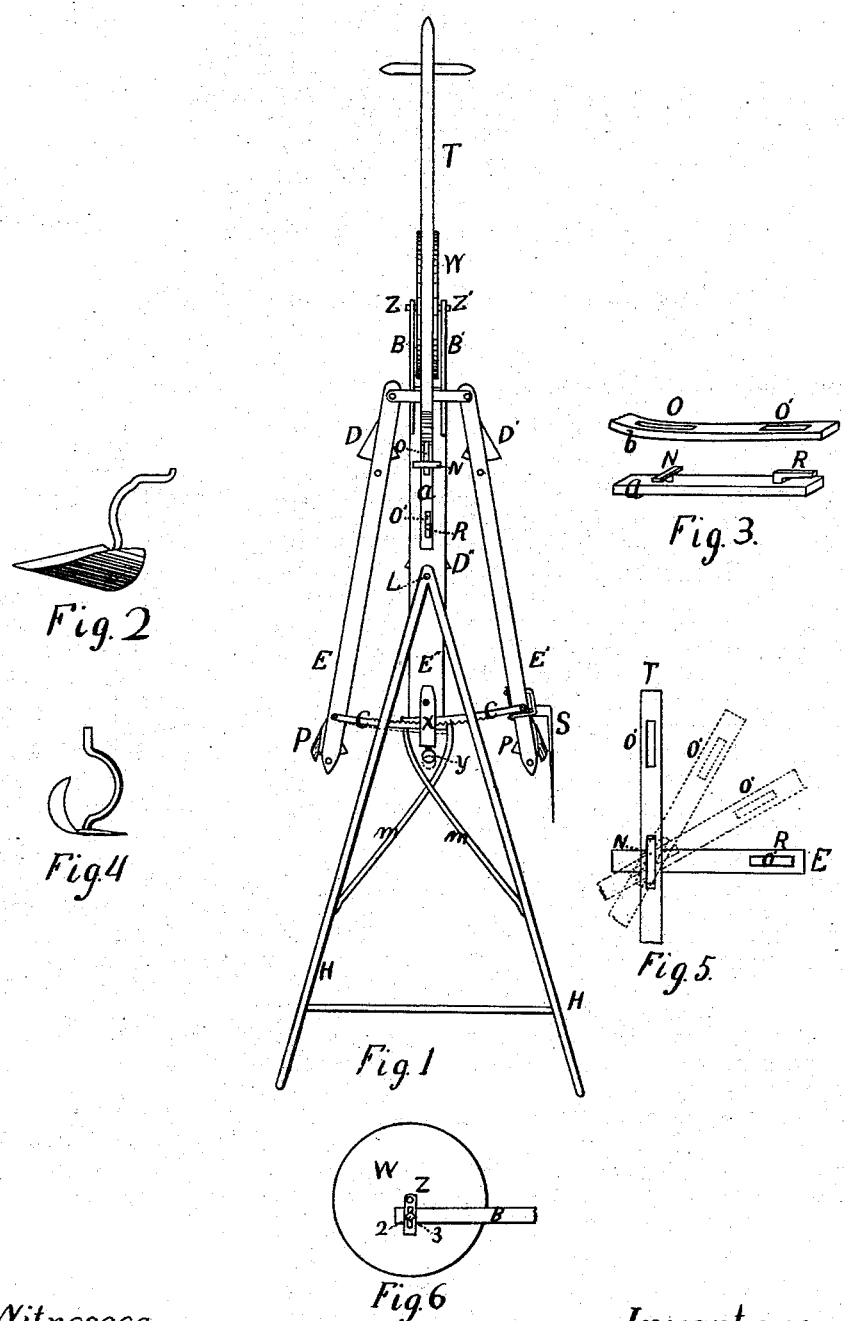

UNITED STATES PATENT OFFICE.

WYMAN FRENCH AND JOHN W. PRENTICE, OF NELSON, MICHIGAN.

IMPROVEMENT IN HAND-CULTIVATORS.

Specification forming part of Letters Patent No. 156,919, dated November 17, 1874; application filed June 23, 1874.

*To all whom it may concern:*

Be it known that we, WYMAN FRENCH and JOHN WESLEY PRENTICE, of Nelson, county of Kent, State of Michigan, have invented a new and useful Improvement in Weeding-Machines or Hand-Cultivators, of which the following is a specification:

The object of our invention is a hand-cultivator with tongue easily and readily attached and detached, which will at the same time cut runners of plants, protect plants from clods, and earth or hill up around the same while cultivating.

In the drawing, Figure 1 represents a top view of the cultivator; Fig. 2, a side view of one of the teeth; Fig. 4, a front view of the same; Fig. 3, a view of the end of tongue to be attached to beam, and also pin and hook for attaching the same. Fig. 6 is a side view of the wheel and its attachment. Fig. 5 represents the manner of adjusting the tongue.

In Figs. 1 and 4 the teeth P P' are represented as of a peculiar form. H are handles; T, the tongue, attached by means of slots O O', pin N, and hook R, (more fully shown in Fig. 3.) By this mode of attaching tongue time and labor are saved over old plan of burr and bolts. To attach tongue T, bring it at right angles with beam E; put slot O on pin N; turn tongue in line with beam E, (denoted with dotted line,) and slot O will slide under long head of pin N, and tongue T cannot be disengaged while remaining in that position. Slot O passes over wedging-hook R, and tongue T, being drawn forward, brings slots O O' tight under the hook R and long head of pin N, holding tongue T tightly to beam E when in use. In Fig. 1, S represents a curved knife attached to side of beam E, to cut off runners from vines, &c. The effect of the peculiar-shaped teeth shown in Figs. 2 and 4 is to keep the clods and sod from falling upon the plants when cultivating closely to them. By reversing the teeth a furrow may be thrown toward and upon the plant for hilling purposes.

What we claim to have invented, and desire to secure by Letters Patent, is—

A hand-cultivator having the horizontal cutting-teeth P, provided with curved standards and fenders, the backward-curved knife S, and the removable tongue T attached by hooks and slots, as shown and described, and for the purposes set forth.

WYMAN FRENCH.
JOHN WESLEY PRENTICE.

Witnesses:
EDWIN A. BURLINGAME,
W. J. STUART.